US009711289B2

(12) United States Patent
Van Kampen et al.

(10) Patent No.: US 9,711,289 B2
(45) Date of Patent: Jul. 18, 2017

(54) CONTROL-ELECTRODE SHIELDING FOR IMPROVED LINEARITY OF A MEMS DVC DEVICE

(71) Applicant: CAVENDISH KINETICS, INC., San Jose, CA (US)

(72) Inventors: Robertus Petrus Van Kampen, S-Hertogenbosch (NL); Ramadan A. Alhalabi, San Jose, CA (US)

(73) Assignee: Cavendish Kinetics, Inc., San Jose, CA (US)

( * ) Notice: Subject to any disclaimer, the term of this patent is extended or adjusted under 35 U.S.C. 154(b) by 77 days.

(21) Appl. No.: 14/779,564

(22) PCT Filed: Apr. 2, 2014

(86) PCT No.: PCT/US2014/032725
§ 371 (c)(1),
(2) Date: Sep. 23, 2015

(87) PCT Pub. No.: WO2014/178988
PCT Pub. Date: Nov. 6, 2014

(65) Prior Publication Data
US 2016/0055979 A1    Feb. 25, 2016

Related U.S. Application Data

(60) Provisional application No. 61/817,385, filed on Apr. 30, 2013, provisional application No. 61/817,251, filed on Apr. 29, 2013.

(51) Int. Cl.
*H01G 5/18*    (2006.01)
*B81B 3/00*    (2006.01)
(Continued)

(52) U.S. Cl.
CPC .............. *H01G 5/011* (2013.01); *H01G 5/013* (2013.01); *H01G 5/16* (2013.01); *H01G 5/18* (2013.01); *H01H 59/0009* (2013.01)

(58) Field of Classification Search
CPC ........ H01G 5/18; H01G 5/011; H01G 5/0136; H01G 5/16; B81B 3/0051; B81B 3/007;
(Continued)

(56) References Cited

U.S. PATENT DOCUMENTS

2004/0124497 A1*  7/2004  Rottenberg ........ H01H 59/0009
                                                  257/532
2012/0068278 A1*  3/2012  Knipe ................. H01H 1/0036
                                                  257/418
2012/0255841 A1* 10/2012  Shin .................... H01H 59/0009
                                                  200/181

FOREIGN PATENT DOCUMENTS

WO    2013028546 A1    2/2013
WO    2013033613 A2    3/2013
WO    2013188633 A1   12/2013

OTHER PUBLICATIONS

International Search Report and Written Opinion dated Jul. 18, 2014, issued in International Application No. PCT/US2014/032725.
(Continued)

*Primary Examiner* — Eric Thomas
*Assistant Examiner* — Michael P McFadden
(74) *Attorney, Agent, or Firm* — Patterson & Sheridan, LLP

(57) ABSTRACT

The present invention generally relates to a MEMS DVC having a shielding electrode structure between the RF electrode and one or more other electrodes that cause a plate to move. The shielding electrode structure may be grounded and, in essence, block or shield the RF electrode from the one or more electrodes that cause the plate to move. By shielding the RF electrode, coupling of the RF electrode to
(Continued)

the one or more electrodes that cause the plate to move is reduced and capacitance modulation is reduced or even eliminated.

10 Claims, 8 Drawing Sheets

(51) Int. Cl.
    *H01G 5/16*     (2006.01)
    *H01G 5/011*     (2006.01)
    *H01G 5/013*     (2006.01)
    *H01H 59/00*     (2006.01)

(58) Field of Classification Search
    CPC .... B81B 2201/0221; H01H 2059/0072; H01H 59/0009
    USPC .......................................................... 361/278
    See application file for complete search history.

(56) References Cited

OTHER PUBLICATIONS

Written Opinion of the International Preliminary Examining Authority, dated Mar. 25, 2015, issued in International Patent Application No. PCT/US2014/032725.

\* cited by examiner

CONTROL-ELECTRODE SHIELDING FOR IMPROVED LINEARITY OF A MEMS DVC DEVICE

BACKGROUND OF THE INVENTION

Field of the Invention

Embodiments of the present invention generally relate to a micro-electromechanical system (MEMS) digital variable capacitor (DVC).

Description of the Related Art

Some MEMS DVC devices are based on a moveable MEMS plate with a control-electrode above (i.e., pull-up or pull-off or PU electrode) and below (i.e., pull-on or pull-in or pull-down or PD electrode) the moveable MEMS plate (i.e., movable electrode, plate electrode, cantilever), as shown schematically in FIG. 1. These electrodes are covered with a top and bottom dielectric layer. Additionally, there is an RF-electrode below the moveable MEMS element between or adjacent to the pull-down electrodes. Between the moveable plate and the RF-electrode there is a gap that is modulated by the voltages applied to either the PU or the PD-electrode. These voltages result in electrostatic forces, which pull the movable electrode either up or down in contact with the dielectric layers to provide a stable minimum or maximum capacitance to the RF-electrode. In this way the capacitance from the moveable plate to the RF-electrode can be varied from a high capacitance state $C_{max}$ when pulled to the bottom (See FIG. 2) to a low capacitance state $C_{min}$ when pulled to the top (See FIG. 3).

The RF signal present on the RF-electrode can couple to the PD-electrode through the dielectric layer, as shown in FIG. 4, resulting in electrostatic forces pulling on the movable electrode above it. The plate will deform due to these electrostatic forces which can result in a modulation of the $C_{max}$ by the RF-signal. This capacitance modulation leads to a harmonic distortion of the RF-signal.

Therefore, there is a need in the art for a MEMS DVC device with minimal or no harmonic distortion of the RF signal.

SUMMARY OF THE INVENTION

The present invention generally relates to a MEMS DVC having a shielding electrode structure between the RF electrode and one or more other electrodes that cause a plate to move. The shielding electrode structure may be grounded and, in essence, block or shield the RF electrode from the one or more electrodes that cause the plate to move. By shielding the RF electrode, coupling of the RF electrode to the one or more electrodes that cause the plate to move is reduced and capacitance modulation is reduced or even eliminated.

In one embodiment, a MEMS DVC comprises a first dielectric layer having a first electrode, an RF electrode, and a shielding electrode disposed therein wherein the shielding electrode is dispose adjacent the RF electrode and the first electrode and wherein the shielding electrode is grounded; a second dielectric layer disposed over the first electrode, the RF electrode and the shielding electrode; a second electrode disposed opposite the first electrode and having a third dielectric layer thereover; and a movable electrode movable from a position in contact with the second dielectric layer and a position in contact with the third dielectric layer.

In another embodiment, method of manufacturing a MEMS DVC comprises depositing an electrically conductive layer over a substrate; patterning the electrically conductive layer to form a first electrode, an RF electrode and a shielding electrode, wherein the shielding electrode is disposed adjacent the RF electrode and the first electrode; depositing a first dielectric layer over the substrate, the first electrode, the RF electrode and the shielding electrode; planarizing the first dielectric layer to expose the first electrode, the RF electrode and the shielding electrode; depositing a second dielectric layer over the exposed electrodes and the first dielectric layer; and forming a moving electrode above the second dielectric layer, wherein the moving electrode is movable from a first position in contact with the second dielectric layer and a second position spaced from the second dielectric layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present invention generally relates to a MEMS DVC having a shielding electrode structure between the RF electrode and one or more other electrodes that cause a plate to move. The shielding electrode structure may be grounded and, in essence, block or shield the RF electrode from the one or more electrodes that cause the plate to move. By shielding the RF electrode, coupling of the RF electrode to the one or more electrodes that cause the plate to move is reduced and capacitance modulation is reduced or even eliminated.

Figure 1:
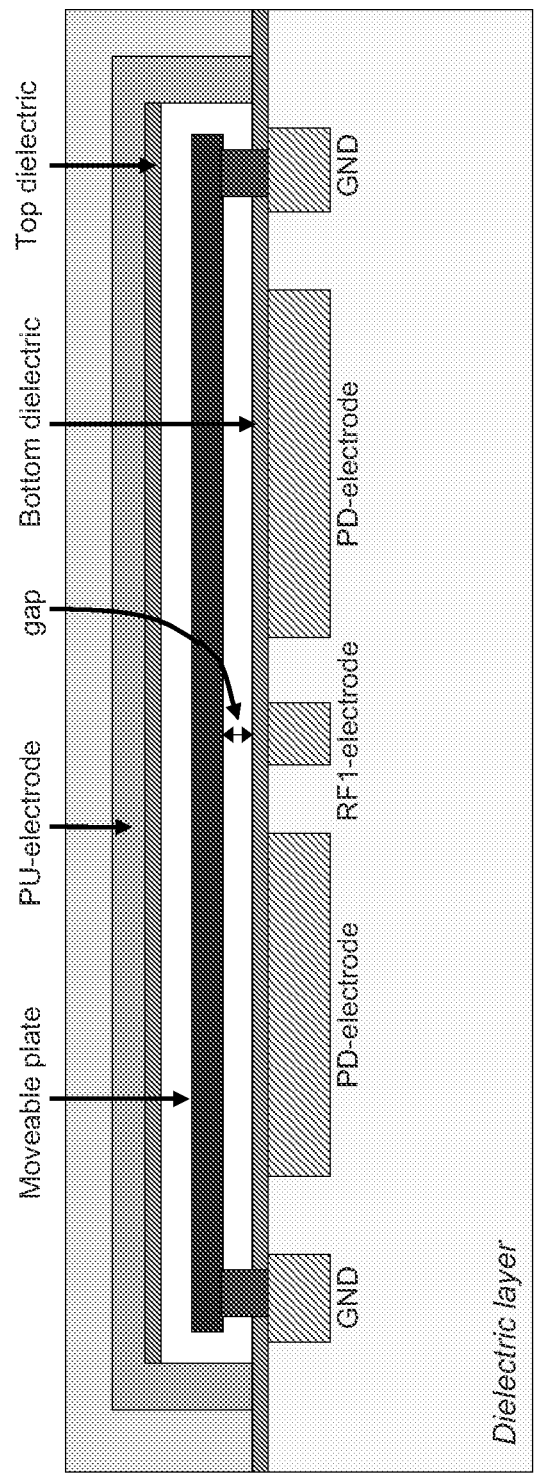
FIG. 1 is a schematic cross-sectional illustration of a MEMS DVC in the free standing state.
Figure 2:
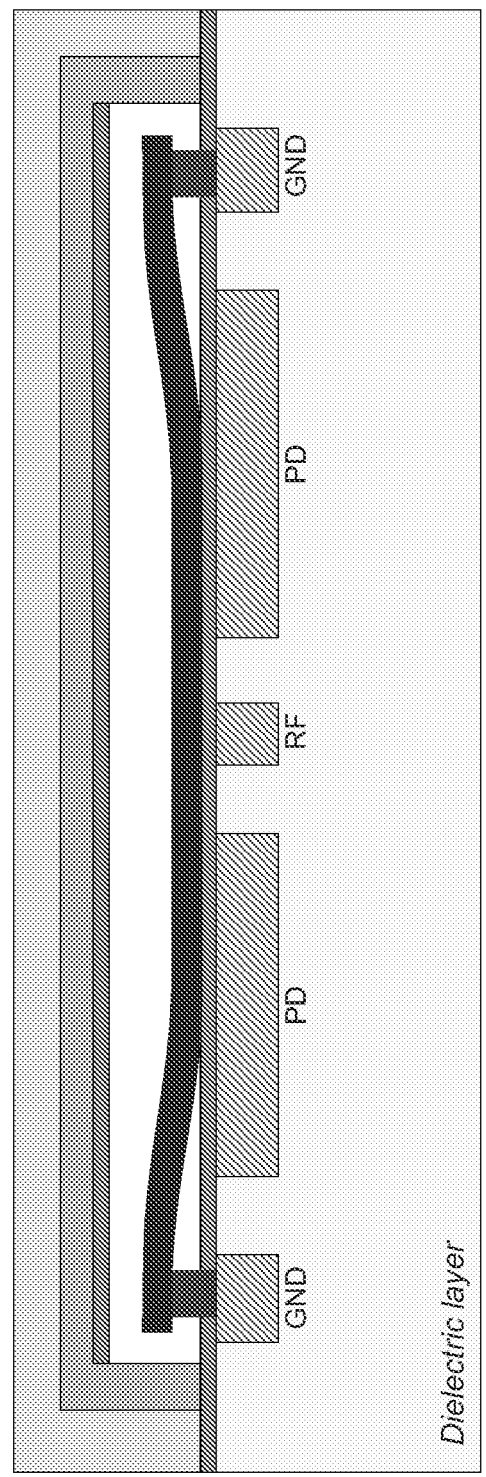
FIG. 2 is a schematic cross-sectional illustration of the MEMS DVC of FIG. 1 in the $C_{max}$ state.
Figure 3:
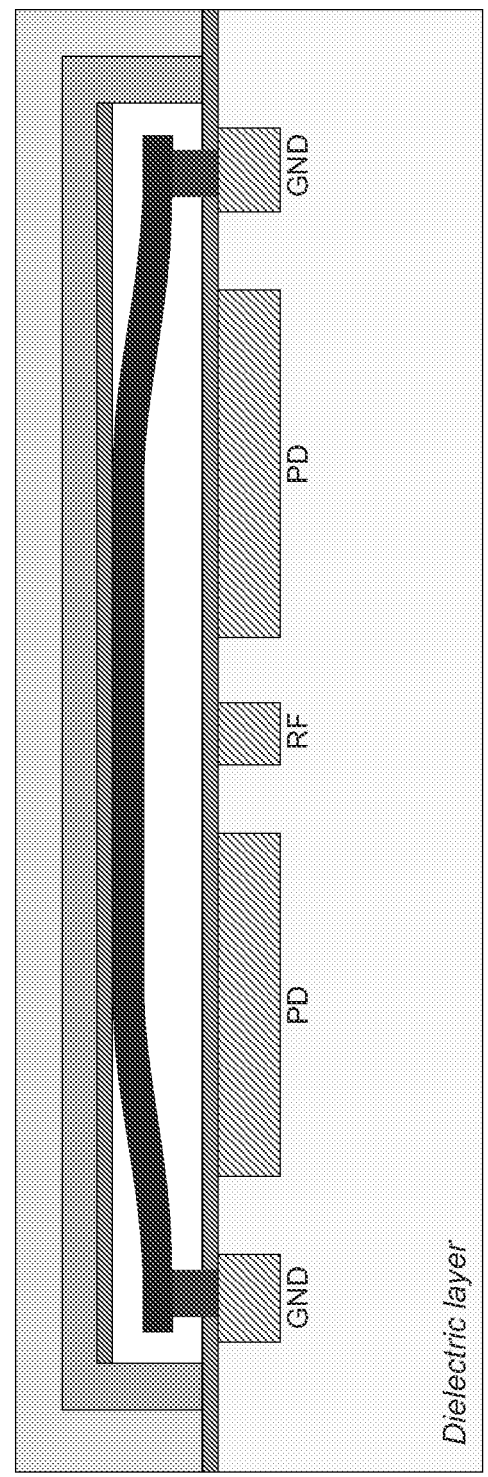
FIG. 3 is a schematic cross-sectional illustration of the MEMS DVC of FIG. 1 in the $C_{min}$ state.
Figure 4:
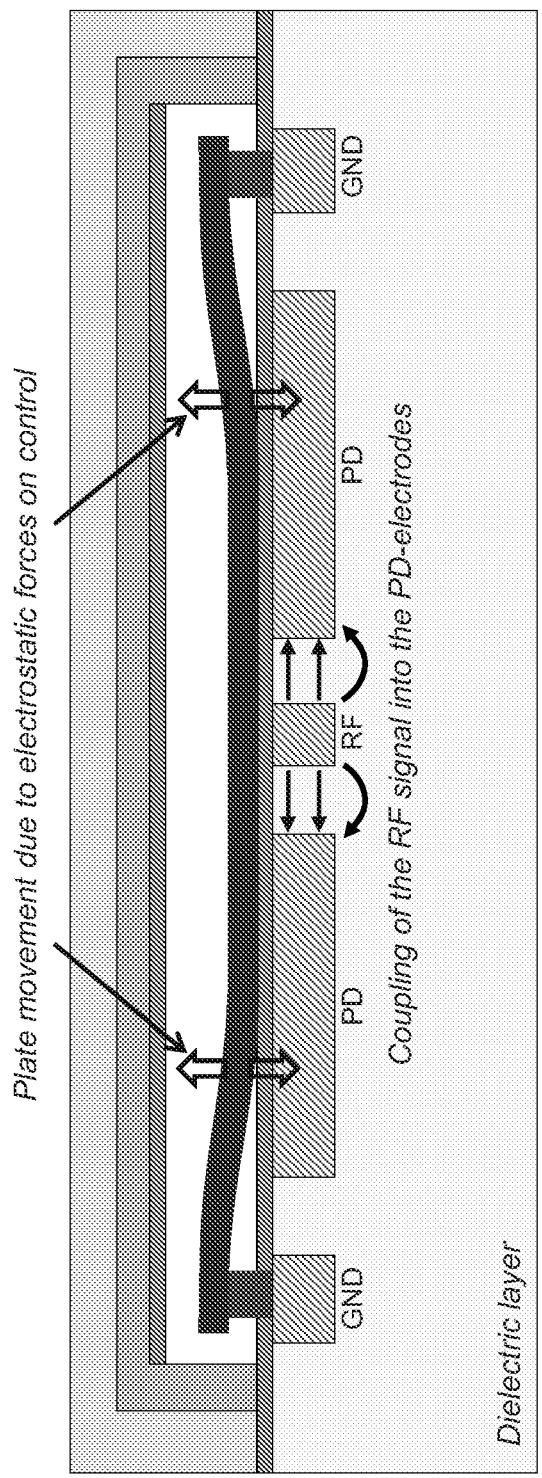
FIG. 4 is a schematic cross-sectional illustration of a MEMS DVC in the $C_{max}$ state showing the impact of the capacitive coupling of the RF-signal into the control electrode.
Figure 5:
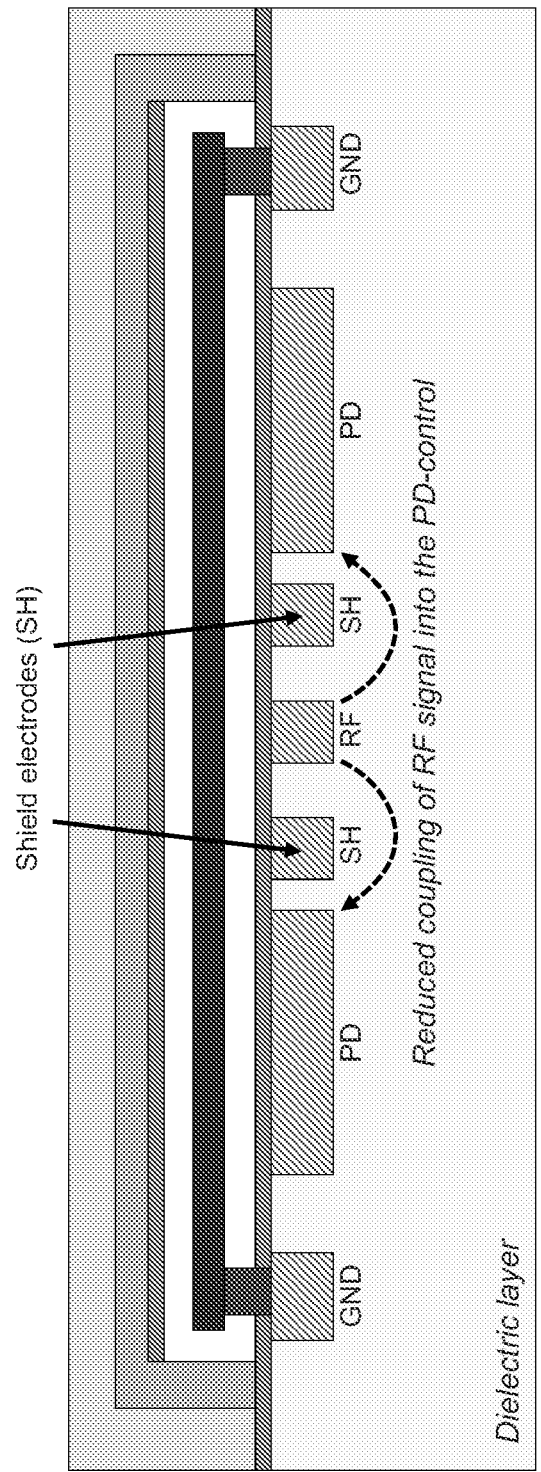
FIG. 5 is a schematic cross-sectional illustration of a MEMS DVC according to one embodiment with a reduced coupling effect from the RF electrode to the pull-down electrode.

FIG. 5 shows a first embodiment which uses lateral shielding electrodes SH placed between the RF-electrode and the PD-electrode to reduce the capacitive coupling between the RF and PD-electrode. The majority of the capacitive coupling occurs between the RF-electrode and the SH-electrode (e.g., shielding electrode). The field-lines between the RF-electrode and the PD-electrode have to travel through the dielectric layer for a longer distance, resulting in a reduced capacitive coupling between RF and PD. The SH-electrodes are electrically connected to the plate (not shown in FIG. 5), i.e. in case of a shunt capacitor this is GND. This embodiment results in a reduced coupling of 3× to 5× compared to the non-shielded solution.

Figure 6:
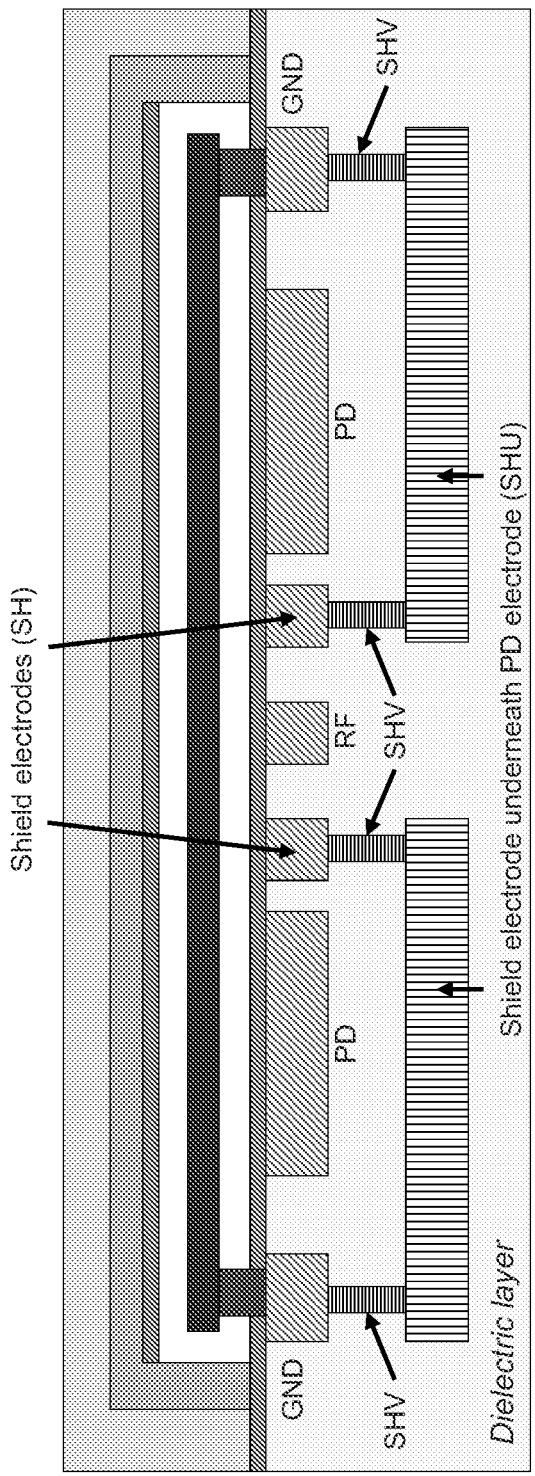
FIG. 6 is a schematic cross-sectional illustration of a MEMS DVC according to another embodiment with a reduced coupling effect from the RF electrode to the pull-down electrode using a full shield underneath the pull-down electrode.

FIG. 6 shows a second embodiment which uses shielding-electrodes SHU (e.g., underneath shielding electrodes) underneath the PD-electrode in addition to the lateral shielding electrodes SH. The SHU-electrodes are connected to SH using an array of shielding vias SHV. In this way a shielding box is created underneath the PD-electrode and the coupling between the RF-electrode and the PD-electrode can be nearly completely eliminated, resulting in a 1000× improvement compared to the non-shielded case. Also in this case the shielding-electrodes are electrically connected to the plate.

Figure 7A:
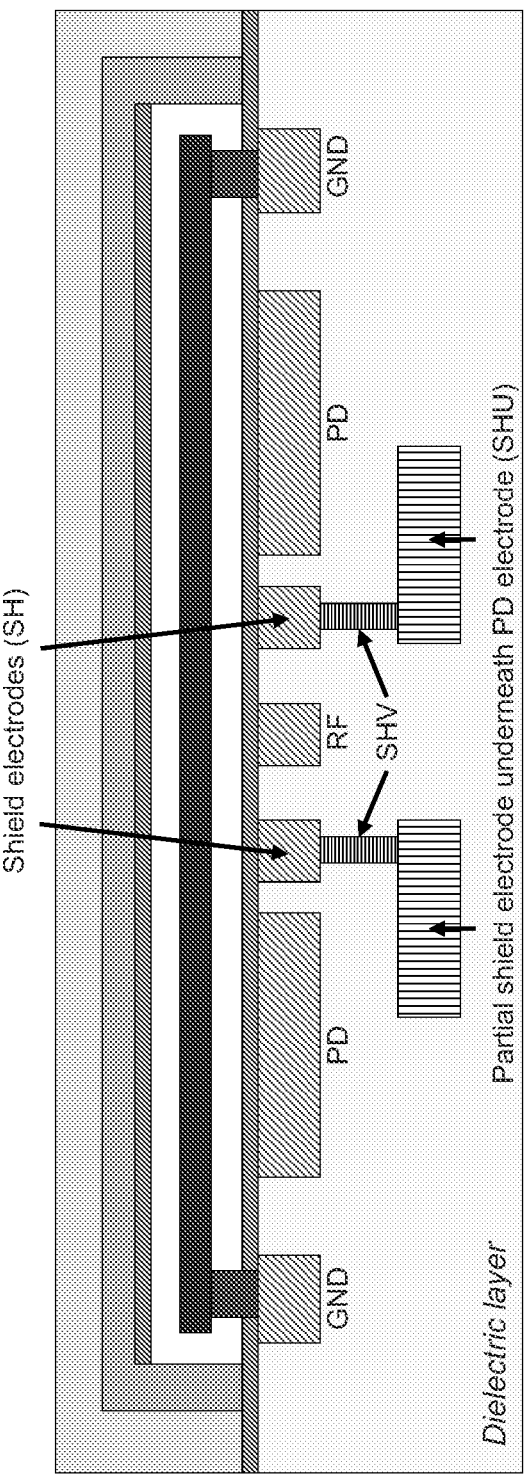
FIG. 7A is a schematic cross-sectional illustration of a MEMS DVC according to another embodiment with a reduced coupling effect from the RF electrode to the pull-down electrode using a partial shield underneath the pull-down electrode.

FIG. 7A shows a third embodiment using a reduced version of the PD shielding. In this case, the shield-electrode SHU does not completely cover the PD-electrode. This shielding method can be just as effective as the complete shielding technique shown in FIG. 6. The advantage of using a partial SHU-shield over a full SHU-shield is the lower stress levels in the SHU metal and surrounding dielectric layer, leading to a more robust manufacturing process.

Figure 7B:
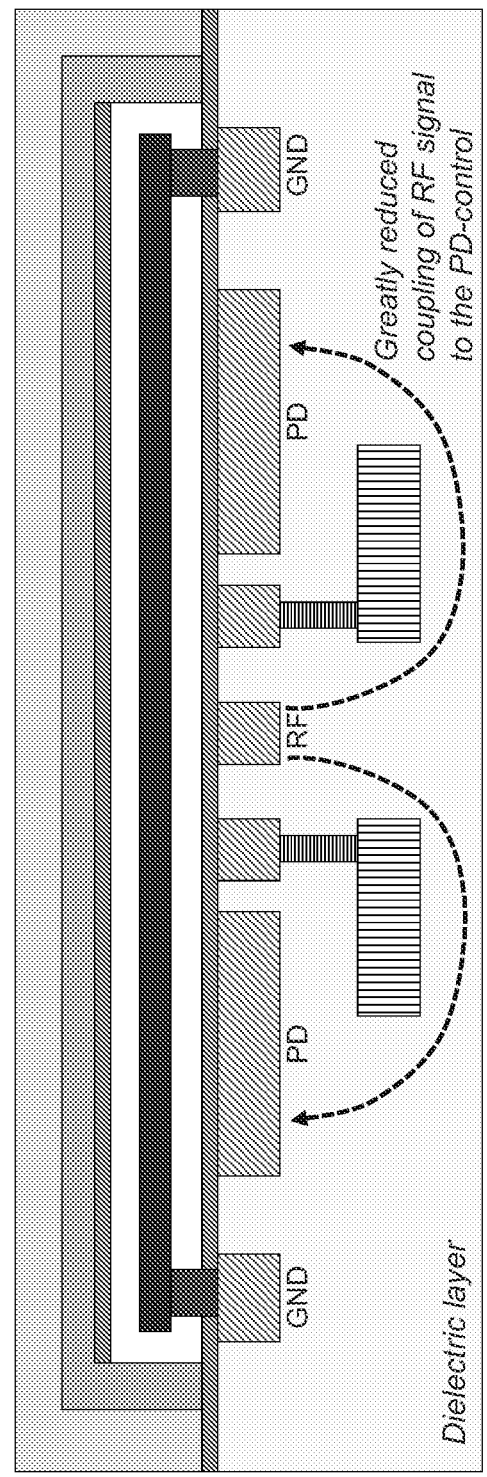
FIG. 7B shows the coupling between the RF electrode and the pull-down electrode of FIG. 7A.

FIG. 7B shows that the field lines from the RF to the PD-electrode with a partial shield electrode have to travel for a much larger distance around the shielding electrodes compared to the embodiment using only lateral shielding SH (FIG. 5). With an appropriate length of the SHU-electrode the same performance as a full-shield SHU electrode can be obtained.

To fabricate the MEMS DVC, a plurality of electrodes may be formed on the substrate. For the embodiments shown in FIGS. 5-7B, the electrodes are formed by depositing an electrically conductive layer, such as aluminum, Titanium-nitride, on the substrate followed by patterning and etching the electrically conductive layer to form two ground electrodes (for coupling to the movable electrode), two pull-down electrodes, one RF electrode and two shielding electrodes. It is to be understood that the number of electrodes shown in FIGS. 5-7B is not to be limiting as more or less electrodes may be present.

A dielectric layer may then be deposited over the substrate and the electrodes to fill the gaps between the electrodes. The dielectric layer is subsequently planarized by means of Chemical Mechanical Polishing (CMP) to result in an essentially planar substrate with the electrodes exposed at the top surface and the gaps between the electrodes filled with the dielectric layer.

A second dielectric layer may then be deposited over the substrate and the electrodes. Openings may be formed through the dielectric layer to expose the ground electrodes which will be electrically connected to the moving electrode. The moving electrode may then be formed of an electrically conductive material such as titanium nitride above the dielectric layer by depositing one or more sacrificial layers, forming an opening through the sacrificial layers to expose the ground electrode, depositing the material for the moving electrode in the opening, on the exposed ground electrode, and over the sacrificial layer. Additional sacrificial layers may be deposited over the moving electrode layer. The sacrificial material may eventually be removed to free the movable electrode to move within a cavity.

A third dielectric layer may be formed over the topmost sacrificial layer and an electrically conductive material may be deposited to form a pull-up electrode. In one embodiment, the electrically conductive material comprises titanium nitride. A sealing layer is formed over the pull-up electrode to seal the cavity. If the sacrificial material is removed after forming the sealing layer, an additional sealing layer may be necessary.

It is to be understood that while reference has been made to a substrate, the substrate may comprise multiple layers, such as multiple dielectric layers. Additionally, it is to be understood that the substrate may refer to any CMOS substrate having numerous structures therein.

As shown in each of FIGS. 5-7B, the shielding electrode extends to a depth within the substrate that is substantially equal to the depth of the pull-down electrode and the RF electrode. It is to be understood that the shielding electrode may extend to a depth that is equal to or greater than the depth that the RF electrode and pull-down electrode extend into the substrate. Additionally, the shielding vias, the shielding electrodes and the underneath shielding electrodes may comprise the same or different electrically conductive material. In one embodiment, the electrically conductive material comprises aluminum, titanium nitride.

As shown in the embodiment of FIG. 6, prior to forming the ground, shielding, pull-down and RF electrodes, underneath shielding electrodes may be formed in the substrate with shielding vias used to connect the shielding electrode to the underneath shielding electrode. Additionally, as shown in FIG. 6, shielding vias may be formed in the substrate to connect the grounding electrodes to the underneath shielding electrodes.

As discussed herein, a design improvement to shield the RF electrode from the pull-down electrode greatly reduces the coupling of the RF signal into the control-electrode to eliminate the capacitance modulation caused by the RF-signal on the PD-electrode. In one embodiment, a lateral shielding electrode SH is added between RF and PD. In another embodiment, in addition to SH, shielding electrodes underneath the PD-electrode (SHU) are also added wherein the shielding electrodes underneath the PD-electrode is connected to the SH-electrodes with an array of shielding vias (SHV). In another embodiment, the shielding electrode underneath the PD-electrode only covers the portion of the PD-electrode closest to the RF-electrode.

While the foregoing is directed to embodiments of the present invention, other and further embodiments of the invention may be devised without departing from the basic scope thereof, and the scope thereof is determined by the claims that follow.

The invention claimed is:

1. A MEMS DVC, comprising:
 a first dielectric layer having a first electrode, an RF electrode, and a shielding electrode disposed therein wherein the shielding electrode is disposed adjacent the RF electrode and the first electrode and wherein the shielding electrode is grounded;
 a second dielectric layer disposed over the first electrode, the RF electrode and the shielding electrode;

a second electrode disposed opposite the first electrode and having a third dielectric layer thereover; and a movable electrode movable from a position in contact with the second dielectric layer and a position in contact with the third dielectric layer, wherein the shielding electrode extends into the first dielectric layer for a depth that is equal to or greater than a distance that either the RF electrode or the first electrode extend into the first dielectric layer.

2. The MEMS DVC of claim 1, further comprising a ground electrode coupled to the movable electrode, wherein the shielding electrode is coupled to the ground electrode.

3. The MEMS DVC of claim 2, further comprising an underneath shield electrode disposed within the first dielectric layer, wherein the underneath shield electrode is disposed at least partially under the first electrode and is spaced from the first electrode by the first dielectric layer, and wherein the shielding electrode is coupled to the underneath shield electrode.

4. The MEMS DVC of claim 3, further comprising a first shielding via coupling the shielding electrode to the underneath shield electrode.

5. The MEMS DVC of claim 4, further comprising a second shielding via coupled to the underneath shield electrode and the ground electrode.

6. The MEMS DVC of claim 5, wherein the first electrode, the RF electrode and the shielding electrode comprise the same material.

7. A MEMS DVC, comprising:
a first dielectric layer having a first electrode, an RF electrode, and a shielding electrode disposed therein wherein the shielding electrode is disposed adjacent the RF electrode and the first electrode and wherein the shielding electrode is grounded;

a second dielectric layer disposed over the first electrode, the RF electrode and the shielding electrode;

a second electrode disposed opposite the first electrode and having a third dielectric layer thereover; and a movable electrode movable from a position in contact with the second dielectric layer and a position in contact with the third dielectric layer, further comprising an underneath shield electrode disposed within the first dielectric layer, wherein the underneath shield electrode is disposed at least partially under the first electrode and is spaced from the first electrode by the first dielectric layer, and wherein the shielding electrode is coupled to the underneath shield electrode.

8. The MEMS DVC of claim 7, further comprising a first shielding via coupling the shielding electrode to the underneath shield electrode.

9. The MEMS DVC of claim 8, further comprising a second shielding via coupled to the underneath shield electrode and the ground electrode.

10. The MEMS DVC of claim 9, wherein the first electrode, the RF electrode and the shielding electrode comprise the same material.

* * * * *